June 19, 1951  E. F. CASWELL  2,557,726
WORK HOLDING CHUCK

Filed Sept. 7, 1948  2 Sheets-Sheet 1

*INVENTOR.*
EDGAR F. CASWELL
BY
*Whittemore, Hulbert & Belknap*
ATTORNEYS

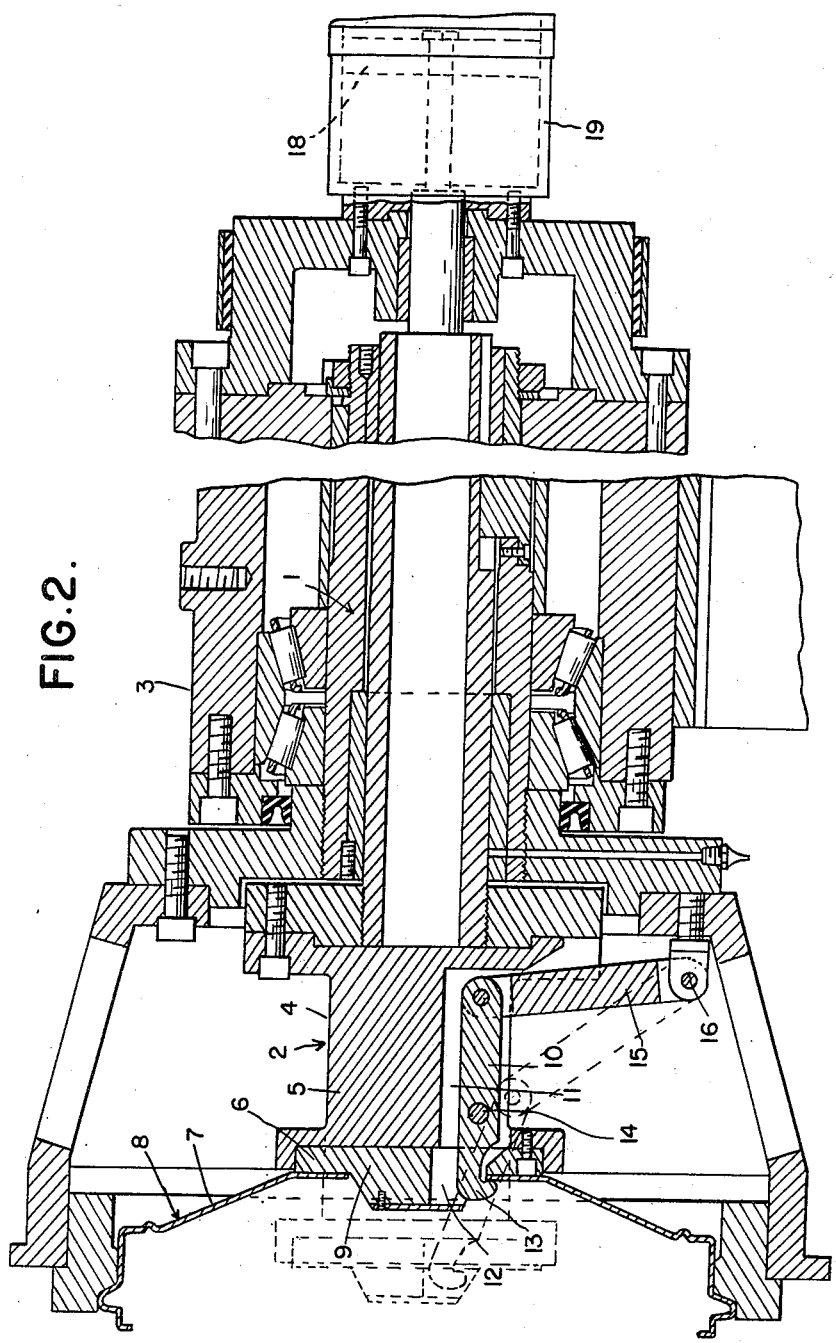

Patented June 19, 1951

2,557,726

UNITED STATES PATENT OFFICE 2,557,726

WORK HOLDING CHUCK

Edgar F. Caswell, Detroit, Mich., assignor to Kelsey-Hayes Wheel Company, Detroit, Mich., a corporation of Delaware Application September 7, 1948, Serial No. 48,085

3 Claims. (Cl. 279—1)

The invention relates to work chucks and has for one of its objects to provide an improved construction of work chuck which facilitates insertion of the work. The invention has for another object to provide an improved construction of chuck which provides for automatically unloading the work. The invention has for still another object to provide an improved construction of chuck having its work engageable jaw movable to operative and inoperative positions respectively engageable with and clearing the work upon movement of the member against which the jaw is adapted to clamp the work. The invention has for a further object to provide a pilot for properly positioning the work.

With these and other objects in view, the invention resides in the novel features of construction and combinations and arrangements of parts as more fully hereinafter set forth.

In the drawings:

Figure 2 is a cross section on the line 2—2 of Figure 1.

Figure 1:
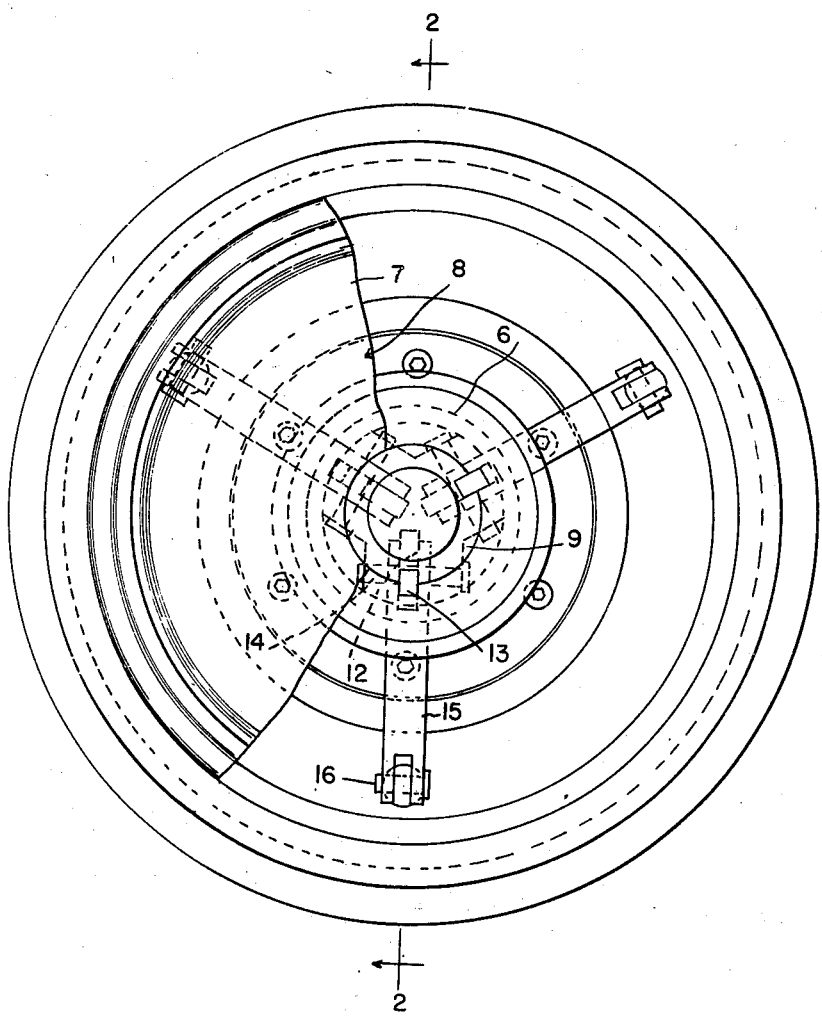
Figure 1 is an end view of a work chuck embodying the invention.

In the present instance, the work chuck is designed to clamp a brake drum shell in place although it is apparent that the chuck may be used for clamping other articles in place. The chuck has the relatively movable members 1 and 2 respectively, the member 1 being suitably journalled in a support 3 and the member 2 being reciprocable within the member 1 and keyed thereto. The member 2 has the head 4 located axially beyond the member 1 and formed of the body 5 and the face plate 6, the face plate forming an abutment for engaging the outer side of the back 7 of the brake drum shell 8. The face plate 6 is formed with the central frusto-conical projection 9 which is adapted to extend through the central opening in the back of the shell and to form a pilot for centrally locating the shell on the face plate.

The chuck also has the series of angularly spaced jaws 10 mounted upon the head 4 to swing radially of the head. These jaws extend within the longitudinal slots 11 in the body 5 and through the openings 12 of the face plate and have the lateral extensions 13 at their ends beyond the abutment face of the face plate for engaging the inner side of the back of the shell. The jaws are pivotally mounted upon the body 5 by means of the pins 14 which extend chordwise of the body at the abutment side of the article. The chuck also has the links 15 which are pivotally connected to the member 1 and the ends of the jaws 10 remote from the lateral extensions on these jaws by the pins 16 and 17 respectively which extend chordwise of the chuck. These links extend generally radially of the chuck and function upon reciprocation of the member 2 to swing the jaws so that their lateral extensions clear the edge of the central opening of the back of the shell or engage or abut the back of the shell. More in detail, the links upon forward movement of the member 2 swing the jaws to inoperative position so that their lateral extensions are positioned within the pilot projection of the face plate as shown by the dot and dash lines in Figure 2 at which time the shell automatically unloads, the pilot projection being frusto-conical, after which another shell may be readily inserted with its central opening over and guided by the pilot projection and with the outer side of its back against the abutment face of the face plate. Then upon movement of the member 2 in the opposite direction the links swing the jaws to operative position so that their lateral extensions engage or abut the inner side of the shell back and securely clamp this back against the abutment face.

For reciprocating the member 2, there is the piston 18 secured to the end of the member 2 remote from the head 4 and the cylinder 19 within which the piston is reciprocable. This cylinder is secured to the member 1 and is provided with suitable ports at its ends for the inlet and outlet of compressed air.

What I claim as my invention:

1. A chuck for an apertured article comprising a reciprocable member having an abutment engageable with one side of the article, a jaw pivotally mounted on said member at the abutment side of the article and having a lateral extension beyond said abutment engageable with the side of the article opposite said abutment, and a pivotally mounted link pivotally connected radially inside its pivotal mounting to said jaw at the abutment side of the article and beyond the pivotal mounting for said jaw, said link serving to swing said jaw upon reciprocation of said member to operative and inoperative positions with said extension respectively engaging and clearing the article.

2. A chuck for an article comprising relatively reciprocable members, one of said members having an abutment engageable with one side of the article, a jaw pivotally mounted on said last mentioned member at the abutment side of the article and having a lateral extension beyond said abutment engageable with the side of the article opposite said abutment, and a link pivotally connected to the other of said members and also pivotally connected to said jaw radially inside the first mentioned pivotal connection and at the abutment side of the article and beyond the pivotal mounting for said jaw, said link serving to swing said jaw upon relative reciprocation of said members to operative and inoperative positions with said extension respectively engaging and clearing the article.

3. A chuck for an apertured article comprising relatively reciprocable members, one of said members having a head, a pilot and an abutment on said head, said pilot projecting beyond said abutment and being engageable with the edge of the aperture in the article and said abutment being engageable with one side of the article, said head, pilot and abutment being provided with angularly spaced longitudinally extending slots; jaws extending within the slots and having lateral extensions movable through the aperture in the article and engageable with the side of the article opposite said abutment, said jaws being pivotally mounted on said last mentioned member at the abutment side of the article, and substantially radially extending links pivotally connected to the other of said members and also pivotally connected to said jaws radially inside the last mentioned pivotal connections and at the abutment side of the article and beyond the pivotal mountings for said jaws, said links serving to swing said jaws upon relative reciprocation of said members to operative and inoperative positions with said lateral extensions respectively engaging and clearing the article.

EDGAR F. CASWELL.

REFERENCES CITED

The following references are of record in the file of this patent:

UNITED STATES PATENTS

| Number | Name | Date |
|---|---|---|
| 1,022,761 | Stvanek | Apr. 9, 1912 |
| 1,467,992 | Becker | Sept. 18, 1923 |
| 2,050,828 | Buell | Aug. 11, 1936 |
| 2,443,895 | Day et al. | June 22, 1948 |

OTHER REFERENCES

Quinlan, American Machinist of February 19, 1925, page 327.